United States Patent [19]

Giannuzzi

[11] Patent Number: 4,732,520
[45] Date of Patent: * Mar. 22, 1988

[54] NON-ROTATING TOGGLE BOLT ASSEMBLY

[76] Inventor: Louis N. Giannuzzi, 59 Dingletown Rd., Greenwich, Conn. 06830

[ * ] Notice: The portion of the term of this patent subsequent to Oct. 14, 2003 has been disclaimed.

[21] Appl. No.: 877,351

[22] Filed: Jun. 23, 1986

Related U.S. Application Data

[63] Continuation-in-part of Ser. No. 815,812, Jan. 2, 1986, Pat. No. 4,668,144, which is a continuation-in-part of Ser. No. 635,068, Jul. 27, 1984, Pat. No. 4,616,968.

[51] Int. Cl.$^4$ .................................................. F16B 21/00
[52] U.S. Cl. ........................................ 411/342; 411/346
[58] Field of Search .............. 411/342, 340, 341, 343, 411/344, 345, 346, 347, 15

[56] References Cited

U.S. PATENT DOCUMENTS

| 2,024,871 | 12/1935 | Parsons | 411/342 |
| 2,061,634 | 11/1936 | Pleister | 411/342 |
| 2,398,220 | 4/1946 | Gelpcke | 411/342 |
| 2,567,372 | 9/1951 | Gelpcke | 411/342 |
| 2,998,743 | 9/1961 | Apfelzweig | 411/342 |
| 3,389,631 | 6/1968 | Vaillancourt | 411/346 |
| 3,513,746 | 5/1970 | Forsberg | 411/346 |
| 4,286,497 | 9/1981 | Shamah | 411/342 |

FOREIGN PATENT DOCUMENTS 1237386  3/1967  Fed. Rep. of Germany ...... 411/342

Primary Examiner—Neill Wilson
Attorney, Agent, or Firm—Michael Ebert

[57] ABSTRACT

A non-rotating toggle bolt assembly which includes a collapsible toggle threadably received on the shank end of a bolt whose length is greater than the thickness of the wall for which the assembly is intended. When the toggle is collapsed, it assumes reduced dimensions to permit its passage through a hole drilled in the wall. On emerging from the hole at the shank end of the bolt, the toggle which is now displaced from the inner surface of the wall resumes its normal dimensions. The assembly is provided with a flexible strap extension, one end of which is coupled to the toggle and acts to prevent rotation thereof when, in the course of installation, the operator turns the bolt to advance the toggle on the shank into engagement with the inner surface of the wall to fasten the assembly thereon. The strap extension also functions when the toggle engages the inner surface of the wall to impose an off center locking force on the toggle to prevent subsequent loosening of the assembly as a result of vibratory and other forces.

8 Claims, 7 Drawing Figures

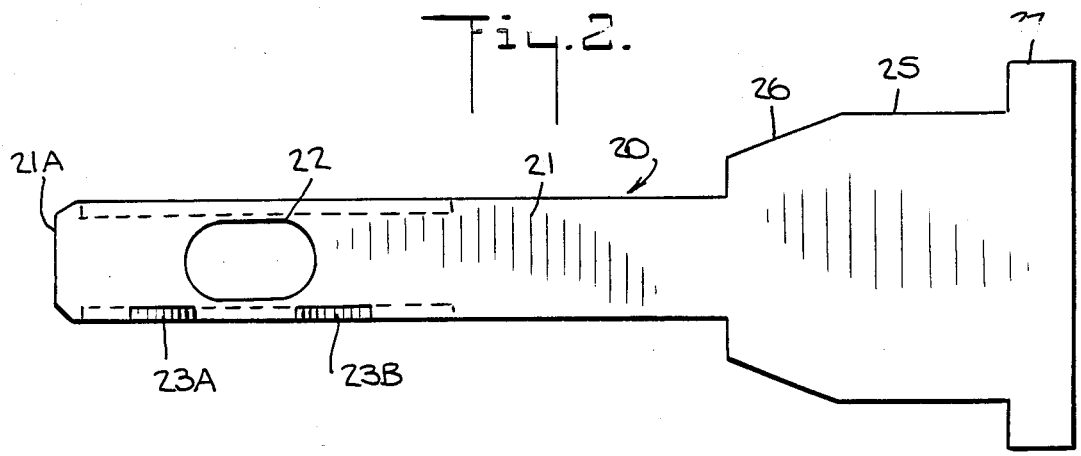
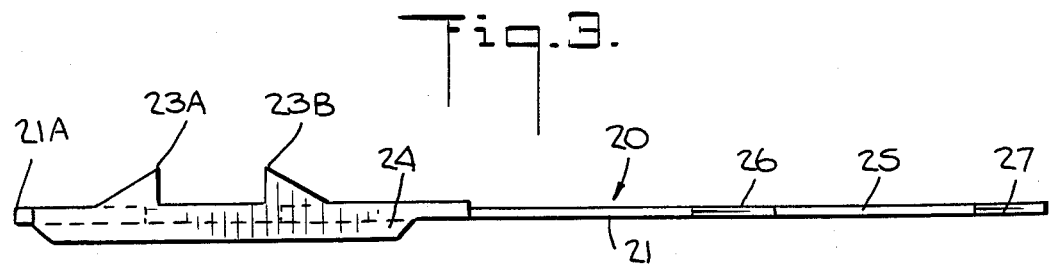
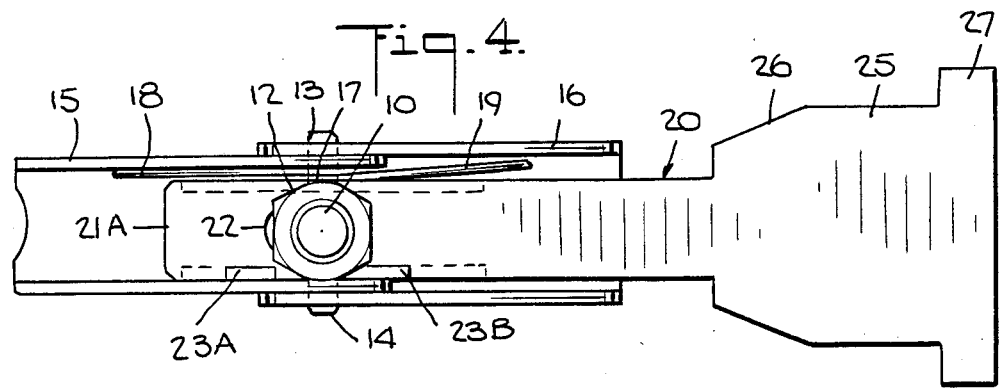
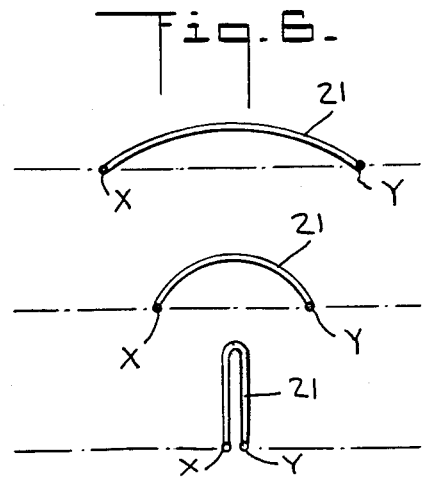

NON-ROTATING TOGGLE BOLT ASSEMBLY

RELATED APPLICATION

This application is a continuation-in-part of my co-pending application Ser. No. 815,812, now U.S. Pat. No. 4,668,144, filed Jan. 2, 1986, which in turn is a continuation-in-part of my earlier patent application Ser. No. 635,068, filed July 27, 1984, now U.S. Pat. No. 4,616,968. The entire disclosures of these prior applications are incorporated herein by reference.

BACKGROUND OF INVENTION

1. Field of Invention:

This invention relates generally to blind fasteners of the toggle bolt type which are insertable in a hole drilled in a hollow wall, and more particularly to a toggle bolt assembly including means acting to prevent rotation of the toggle in the course of installation when the bolt is turned to axially advance the toggle into engagement with the inner surface of the wall to fasten the assembly thereon, and acting after the toggle engages the inner surface to prevent it and the bolt from subsequently turning as a result of vibratory forces.

2. Prior Art:

Blind fasteners of the toggle bolt type are commonly used to secure fixtures and other objects against the outer surface of a hollow wall formed of masonry, tile, cinder block, plaster or fiber board, or any other plate or panel capable of supporting a load.

As used herein, the term "toggle bolt" refers to a blind fastener having a collapsible toggle threadably received on the shank of a bolt whereby when the bolt is passed through a hole in a wall, the toggle is then collapsed to permit such passage; and when emerging from the hole, the toggle resumes its non-collapsed form to effect a fastening action. By a collapsible toggle is meant any holding element that is foldable, bendable, compressible or otherwise changeable in form to assume in the collapsed state reduced dimensions which permit its passage through a hole. Hence, while in this application there is illustrated by way of example a toggle formed by a pair of foldable wings, it is to be understood that the invention is applicable to other forms of collapsible toggles.

The term "wall" as used herein is intended to include any panel, plate or other drillable substrate on which an object is to be fastened.

The most commonly known toggle bolt assembly consists of a bolt having a threaded shank on which is received a nut provided with opposed lugs or trunnions to pivotally support a pair of spring-biased wings. The wings are normally outstretched, but they fold in against the bolt when the assembly is inserted in a drilled hole in the wall, the hole diameter being large enough to accommodate the folded-in wings. Toggle bolt assemblies of this conventional type are commercially available in various sizes and weights, the gauge depending on the loads they are intended to support on a wall.

When installing a conventional toggle bolt assembly in a hollow wall to hold a fixture or other object against its outer surface, a hole is first drilled in the wall, the diameter of the hole depending on the gauge of the toggle bolt. The toggle bolt assembly is inserted through a mounting hole in the fixture and pushed into the wall hole, the wings folding in to permit such entry. The length of the bolt is greater than the combined thickness of the fixture, the wall and the folded-in toggle wings. Hence, the wings pivoted on the nut, which initially are near the end of the bolt, resume their outstretched state when the bolt is fully inserted. The outstretched wings are thus displaced a substantial distance from the inner surface of the wall. The extent of this displacement depends on the length of the bolt relative to said combined thickness.

It is not at this point possible to tighten the wall-inserted toggle bolt; for should one turn the bolt with a screw driver, the wings, which are unrestrained, will turn with the bolt and the trunnion nut will not advance on the threaded shank of the bolt toward the inner surface of the wall. In order, therefore, to effect tightening with a conventional toggle bolt assembly, the installer must pull the fixture away from the wall to bring the outstretched wings into engagement with the inner surface of the wall and thereby resist a turning action. In this way, the bolt can be turned with a screw driver without at the same time turning the wings, and the nut will then advance on the threaded shank to effect tightening of the toggle bolt assembly.

In practice, the need to manually pull the fixture away from the wall in order to tighten the toggle bolt will in many instances present serious difficulties. For example, if panels of insulation material are to be fastened to a hollow roof by means of roofing plates, the installer for each such plate must insert the toggle bolt through a mounting hole in the plate and thread the shank of the bolt into the trunnion nut. A hole in the insulation panel and a hole in the roof are then made. The bolt carrying the toggle wings is inserted through the panel and roof holes; and the wings then assume their outstretched state at a position displaced from the inner surface of the roof.

In order to now tighten the anchor bolt, the installer must place his fingers beneath the roofing plate so as to pull the roofing plate away from the insulation panel lying on the roof until the wings then engage the inner surface of the roof, thereby preventing rotation of the wings to permit tightening of the toggle bolt.

Most professional installers now use electric screw drivers which to be rendered operative must be pressed against the head of the bolt. This presents no difficulty when the bolt head lies against a stable substrate. But if the head of the bolt lies against a roofing plate being held in one hand by the installer while his other hand grasps the electric screw driver, the inherent instability of the situation makes installations very difficult and sometimes dangerous.

One must bear in mind that a professional installer is required in the case of a typical roof installation to put in thousands of toggle bolts, and that with conventional toggle bolts, the need to pull up the roofing plate in order to tighten the bolt not only adds significantly to the time it takes to make the installation, but also increases the risk of crushed fingers or other mishaps.

Moreover, in a roof installation in which the insulation panels are secured by toggle bolts, the toggle bolts are vertically disposed; and since the exposed roof is subject to vibratory and compressive forces, this causes the toggle wings to actually unscrew to a point where the wings will fall off the screw, thereby leaving the insulation panels unsecured. As a consequence, the panels may be blown off the roof in a high wind producing a strong updraft.

Thus, the two problems of greatest concern which are encountered with conventional toggle bolt assemblies are the problem of toggle head rotation as the bolt is turned to bring the head into engagement with the inner surface of the wall and the problem of post installation loosening of the toggle bolt as a result of vibratory and other forces which cause reverse turning of the head on the bolt.

My above-identified related patent applications are addressed to both problems and provide solutions thereto. In these related applications there are disclosed a non-rotating toggle bolt assembly adapted to fasten a fixture or other object to a hollow wall, which assembly, after insertion in a hole drilled in the wall, may be tightened by a torque tool, such as a screw driver, without the need to pull the fixture away from the wall, thereby making the installation procedure faster and safer. The toggle bolt assembly includes a long tail coupled to the toggle head that acts to prevent rotation of the head in the course of installation when the bolt or screw is turned in to advance the toggle head to tighten the anchor bolt on the wall, and which also includes a short tail to prevent vibration or other forces from loosening the assembly after such installation.

These long and short tails are preferably made of metal wire and include a coupling loop or other means to link the tails to the trunnion nut. Hence, an assembly procedure is required to couple the tails to toggle bolts. This procedure is time consuming and difficult to carry out.

The following patents which deal with various forms of toggle bolts are of background interest:
Pleister: U.S. Pat. No. 2,061,634
Gelpcke: U.S. Pat. No. 2,398,220
Shamah: U.S. Pat. No. 4,286,497
Apelzweig: U.S. Pat. No. 2,998,743
Gelpcke: U.S. Pat. No. 2,567,372
Zifferer: U.S. Pat. No. 1,228,512
Goewey: U.S. Pat. No. 1,373,188
Brenizer: U.S. Pat. No. 1,600,034
Karitzky: U.S. Pat. No. 2,616,327
Topf: U.S. Pat. No. 3,302,508
Vaillancourt: U.S. Pat. No. 3,389,631
Forsberg: U.S. Pat. No. 3,513,746
Roberson: U.S. Pat. No. 4,079,655
Shamah: U.S. Pat. No. 4,286,497
Schrandolph: U.S. Pat. No. 1,237,386 (Fed. Rep. Ger.)

SUMMARY OF INVENTION

The main object of this invention is to provide a toggle bolt assembly adapted to fasten a fixture or other object to a hollow wall, the assembly including a flexible strap extension that in the course of installation acts to prevent rotation of the toggle head as the operator turns the bolt to bring the toggle head into tight engagement with the inner surface of the wall, and which acts after installation to prevent loosening of the assembly as a result of vibratory and other forces to which the wall is subjected.

A significant advantage of the strap extension is that it serves a dual function and it is not necessary as in the locking means disclosed in my related applications to provide separate means to carry out each function.

Also an object of this invention is to provide a flexible strap extension for a toggle bolt assembly which is securely coupled thereto by a simple pushing action, thereby making it possible to convert a conventional toggle bolt assembly into a non-rotating assembly without difficulty.

Still another object of the invention is to provide a strap assembly of the above type which can be mass produced at relatively low cost.

Briefly stated, these objects are attained in a non-rotating toggle bolt assembly comprising a collapsible toggle threadably received on the shank end of a bolt whose length is greater than the thickness of the wall for which the assembly is intended. When the toggle is collapsed, it assumes reduced dimensions to permit its passage through a hole drilled in the wall. On emerging from the hole at the shank end of the bolt, the toggle which is now displaced from the inner surface of the wall, resumes its normal dimensions.

Also provided is a flexible strap extension which at one end is coupled to the toggle and extends from one side thereof to terminate in a restraining element, the length of the extension being such that in the course of installation when the toggle is collapsed to permit the assembly to pass through a hole drilled in the wall, the restraining element does not emerge from the hole but remains jammed therein when the toggle after emerging from the hole resumes its normal dimensions, thereby preventing rotation of the toggle as the bolt is turned by an operator to advance the toggle into engagement with the inner surface of the wall to fasten the assembly to the wall.

Since the restraining element of the flexible strap is held in a fixed position as the toggle is advanced toward the inner surface of the wall, this causes the strap in the course of toggle advance to bow out and to then form a folded spring that is clamped between the toggle and the inner surface. This spring imposes an off-center force on the toggle which prevents subsequent loosening of the installed toggle assembly as a result of vibratory and other forces to which the wall is subjected.

OUTLINE OF DRAWINGS

For a better understanding of the invention as well as other objects and further features thereof, reference is made to the following detailed description to be read in conjunction with the accompanying drawings, wherein:

FIG. 2 is a top view of the strap;

FIG. 3 is a side view of the strap;

FIG. 4 shows the underside of the toggle with the strap installed therein;

FIG. 6 (A, B and C) shows the different forms assumed by the strap extension in the course of tightening the assembly.

DETAILED DESCRIPTION

Figure 1:
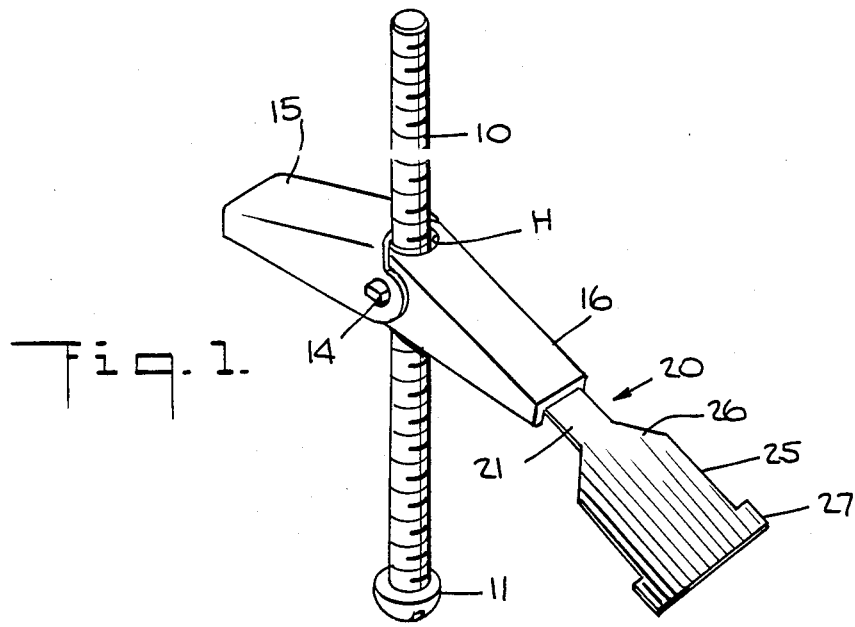
FIG. 1 is a perspective view of a non-rotating toggle bolt assembly in accordance with the invention, the assembly including a flexible strap.

Referring now to FIGS. 1 to 4 of the drawing, there is shown a non-rotating toggle bolt assembly according to the invention, including a threaded bolt or screw 10 having a slotted head 11 adapted to receive the blade of a screw driver. The head may be in other forms to accommodate a torque tool. The length of the screw shank exceeds the thickness of the hollow wall for which the toggle bolt is intended. Threadably received on the end of the screw shank is a nut 12 provided with oppositely-projecting lugs 13 and 14. These form trunnions to pivotally support inner and outer foldable wings 15 and 16, the inner wing folding into the outer wing.

Wings 15 and 16 have a channel-shaped cross section and are provided at their adjacent edges with complementary arcuate cut-outs to define an opening H which registers with the bore in nut 12 to admit the shank of the screw. These cut-outs form a pair of shoulder abutments that limit the extent to which the wings may be folded out.

As shown in FIG. 4, encircling trunnion 14 is the coil 17 of a biasing spring whose straight wire ends 18 and 19 extend under wings 15 and 16, respectively, and act to normally maintain the wings in an outstretched state. The wings are foldable in toward screw 10 against the tension of the biasing spring; and when the folded-in wings are released, they spring out to resume their normal outstretched state.

Also included in the assembly is a flexible strap extension, generally identified by reference numeral 20. This is formed of flexible, plastic resilient material having spring like properties, such as polypropylene or a moldable synthetic plastic having similar characteristics. As shown separately in FIGS. 2 and 3, strap extension 20 includes a band 21 whose width is smaller than the transverse distance between the side walls of the channel-shaped wings so that the band is insertable between these side walls. The front end 21A of the band 21 is chamfered to facilitate such insertion when the band is pushed in along the inner surface of wing 15 or 16.

Near the front end 21A of band 21 is an oblong hole 22. When, as shown in FIG. 4, the band is pushed in along the inner surface of wing 16, the hole 22 then lies under hexagonal nut 12 in registration with the opening H in the toggle, the front end portion of the band overlying a corresponding portion of wing 15.

In order to retain the inserted strap extension in its proper place, band 21, as best seen in FIGS. 2 to 4, has a pair of spaced teeth 23A and 23B on one side thereof, these teeth having opposed right angle triangular forms. Teeth 23A and 23B allow ready entry of the strap to bring hole 22 into registration with the toggle opening, at which point the teeth lie against opposite sides of nut 12 and resist withdrawal of the strap.

Band 21 terminates in a restraining element 25 whose width is broader than that of band 21. This element includes a wedge-shaped front end portion 26 to facilitate entry of the restraining element in a hole drilled in the wall, and a rear end portion having lateral lugs 27 to resist withdrawal of the restraining element from the drilled hole in the wall.

Figure 5:
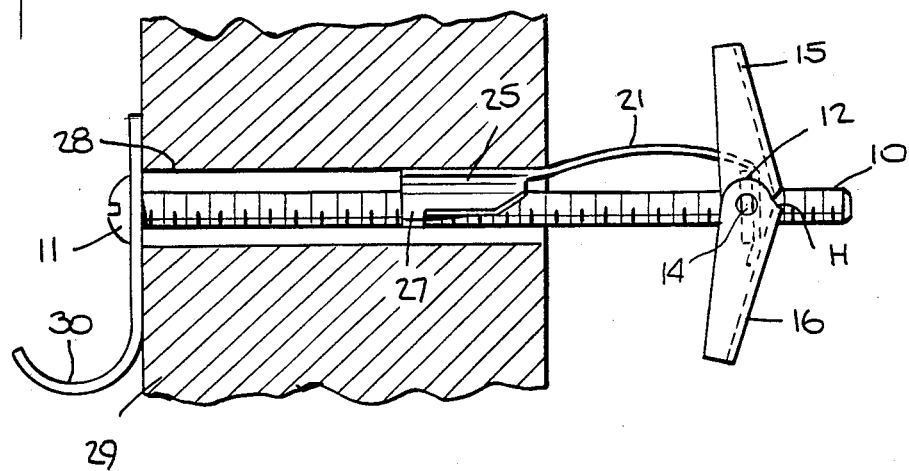
FIG. 5 shows the assembly after it is first inserted through a hole in the wall and before it is tightened.

When the toggle bolt assembly is to be installed by an operator in hole 28 drilled in a hollow wall 29 of masonry or other wall material capable of supporting the intended load for this purpose of securing a load-holding fixture 30 or other object to the outer surface of the wall as shown in FIG. 5, in order to prepare for installation, the operator first passes the bolt 10 through the mounting hole in the fixture and then turns the trunnion nut 12 onto the end of the screw shank.

The operator then pushes the assembly through the drilled hole 28 in a hollow wall 29. This action causes the pivoted wings 15 and 16 to fold in to permit passage through the hole whose diameter is large enough to accommodate the assembly in the folded-in state.

When wings 15 and 16 fold in, this action causes the strap extension 20 extending from wing 16, as shown in FIG. 1, to swing toward the shank of bolt 10. The length of strap extension 20 is such that in the course of insertion of the toggle bolt assembly, the restraining element 25 does not emerge from the hole. And because the width of the restraining element which is formed of flexible plastic material is greater than the diameter of the drilled hole, the restraining element is deformed and jammed in the drilled hole at a position therein that depends on the length of the hole in the wall. If, therefore, the wall is relatively thick, as shown in FIG. 5, the deformed restraining element after insertion of the toggle assembly may be fairly close to the inner surface of the wall, while with a thinner wall, the restraining element may be closer to the outer surface of the wall.

Because the strap extension 26 is of flexible material and one end is coupled to the toggle while its other end terminates in restraining element 25 which is trapped within the drilled hole, when the toggle assembly is fully inserted in the hole and wings 15 and 16 are then outstretched at a position displaced from the inner surface of the wall, as shown in FIG. 5, then the band 21 of the strap extension in the region between the inner surface of the wall and the toggle wings is somewhat bowed out.

As the bolt 10 is turned by the operator, the strap extension acts to prevent turning of the toggle, as a result of which the toggle is caused to advance toward the inner surface of the wall.

In the course of toggle advance toward the inner surface of the wall, band 21 of the flexible strap extension becomes progressively more bowed. This is shown in FIGS. 6 A, B and C, where the band 21 of the strap extension is bowed between point X representing the inner surface of the wall and point Y representing the toggle position.

As the toggle advances from point Y to point X, the distance therebetween diminishes to increase the bowing inlet, as shown in FIG. 6C, the toggle engages the inner surface of the wall and the band 21 is now folded and functions as a folded spring.

Figure 7:
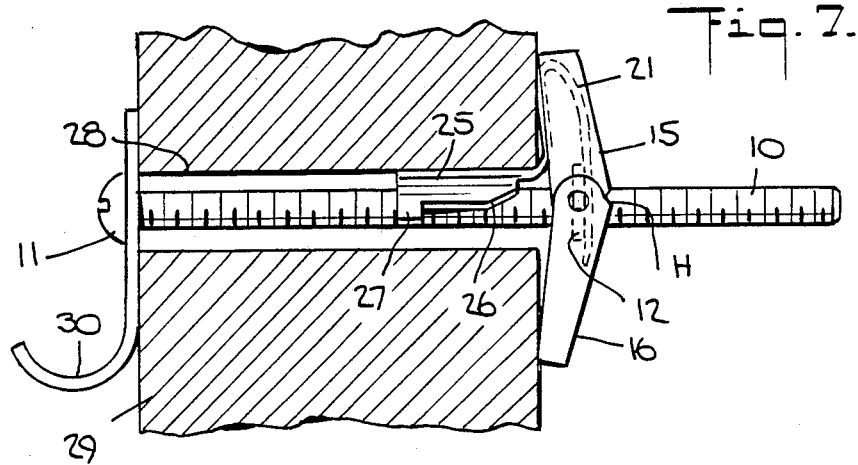
FIG. 7 shows the assembly after it is tightened.

Since, as shown in FIG. 7, this folded spring is interposed between toggle wing 16 and the inner surface of wall 29, in seeking to unfold to resume its normal form, the folded spring imposes an off center force of the toggle which resists turning of the toggle or the bolt. As a consequence, vibratory or other forces to which the wall may be subjected and which otherwise act to loosen the toggle bolt assembly do not act to do so, for reverse turning of the toggle is prevented by the folded spring.

Thus, the strap extension serves a dual function; for it not only prevents rotation of the toggle as the bolt is turned in the course of tightening the toggle bolt assembly, but it also acts after such installation to prevent loosening of the assembly after installation. As a consequence, the installed toggle bolt assembly remains tight despite vibratory and other forces which seek to loosen the assembly.

While there has been shown and described a preferred embodiment of an improved non-rotating toggle bolt assembly in accordance with the invention, it will be appreciated that many changes. and modifications may be made therein without, however, departing from the essential spirit thereof.

I claim:
1. A non-rotating toggle bolt assembly for supporting a fixture or other object against the outer surface of a hollow wall, said assembly comprising:

A. a bolt having means at one end to effect turning thereof, and a threaded shank whose length exceeds the thickness of the wall for which it is intended;
B. a collapsible toggle threadably received on the end of the shank, said toggle when in the collapsed state assuming reduced dimensions permitting its passage through a hole in the wall, the toggle when emerging from the hole assuming enlarged dimensions; and
C. locking means to prevent rotation of the toggle, whereby when said bolt is turned, the toggle will then advance along the shank toward the inner surface of the wall to engage said inner surface, said locking means being constituted by an elongated member coupled at one end to the toggle and having a restraining zone therein whose form is such as to cause it to engage the wall of the hole, the length of the member being such that in the course of installation when the toggle is collapsed to pass through the hole, the member but not the restraining zone also passes therethrough, the restraining zone being substantially closer to the bolt turning means than the toggle is to the turning means, and the restraining zone do not emerge from the hole but engages the wall of the hole when the toggle after emerging from the hole assumes its enlarged dimensions, whereby the restraining zone prevents rotation of the toggle, said elongated member being a strap extension provided with a relatively broad end portion that functions as the restraining zone.

2. An assembly as set forth in claim 1, wherein said strap extension is formed of resilient plastic material which bows out in the course of installation to define a folded spring that is interposed between the toggle and the inner surface of the wall engaged by the toggle to impose a force on the toggle which prevents loosening of the installed assembly.

3. An assembly as set forth in claim 1, wherein said collapsible toggle is constituted by a trunnion-nut treadably received on the shank and a pair of spring-biased foldable wings having complementary cut-cuts to define an opening which lies in registration with the hole in the nut.

4. An assembly as set forth in claim 3, wherein said strap extension runs along one of said wings and extends therefrom.

5. An assembly as set forth in claim 4, wherein said strap extension includes a band which lies under the nut and has a hole therein which registers with said opening.

6. An assembly as set forth in claim 5, wherein said band is provided with teeth adjacent said hole that lie adjacent the sides of the strap extension.

7. An assembly as set forth in claim 1, wherein said strap extension is formed of resilient polypropylene material.

8. An assembly as set forth in claim 1, wherein said end portion has lateral lugs.

* * * * *

UNITED STATES PATENT OFFICE
CERTIFICATE OF CORRECTION

PATENT NO. : 4,732,520

DATED : March 22, 1988

INVENTOR(S) : Louis N. Giannuzzi

It is certified that error appears in the above-identified patent and that said Letters Patent are hereby corrected as shown below:

Column 7, line 25, "do" should have read --does--
Column 8, lines 11 and 12, "treadably" should have read --threadably--
Column 8, line 13, "cut-cuts" should have read --cut-outs--

Signed and Sealed this

Twelfth Day of July, 1988

Attest:

DONALD J. QUIGG

Attesting Officer

Commissioner of Patents and Trademarks